(12) United States Patent
Ramm

(10) Patent No.: US 7,067,833 B2
(45) Date of Patent: Jun. 27, 2006

(54) DEVICE FOR WRAPPING BODIES, IN PARTICULAR BALES OF HARVESTED MATERIAL

(75) Inventor: Christoph Ramm, Braunschweig (DE)

(73) Assignee: Lely Enterprises AG a Swiss Limited Liability Co., Zug (CH)

( * ) Notice: Subject to any disclaimer, the term of this patent is extended or adjusted under 35 U.S.C. 154(b) by 99 days.

(21) Appl. No.: 10/290,207

(22) Filed: Nov. 8, 2002

(65) Prior Publication Data

US 2003/0089864 A1 May 15, 2003

(30) Foreign Application Priority Data

Nov. 9, 2001 (EP) .................................. 01204263

(51) Int. Cl.
*B65H 19/16* (2006.01)

(52) U.S. Cl. ............................... 250/559.12; 242/420.3
(58) Field of Classification Search ................ 250/221, 250/222.1, 548, 559.12; 340/555–557; 242/420.3, 242/534.1, 554.4, 555.1, 557, 559.4, 416, 242/417, 534, 563
See application file for complete search history.

(56) References Cited

U.S. PATENT DOCUMENTS

| | | | | |
|---|---|---|---|---|
| 4,116,399 A | * | 9/1978 | Mosburger et al. | 242/552 |
| 4,682,038 A | * | 7/1987 | Focke | 250/548 |
| 4,893,763 A | * | 1/1990 | Wales et al. | 242/420.3 |
| 5,156,350 A | * | 10/1992 | Wales et al. | 242/420.3 |
| 5,344,089 A | * | 9/1994 | Crowley et al. | 242/417 |
| 5,651,511 A | * | 7/1997 | Crowley et al. | 242/420.3 |

FOREIGN PATENT DOCUMENTS

| | | |
|---|---|---|
| DE | 10011158 A1 | 9/2001 |
| EP | 0 233 471 | 8/1987 |
| EP | 1084976 A2 | 3/2001 |
| EP | 1090543 A1 | 4/2001 |
| WO | PCT/F198/00136 | 9/1998 |

* cited by examiner

*Primary Examiner*—Stephone B. Allen
(74) *Attorney, Agent, or Firm*—Penrose Lucas Albright

(57) ABSTRACT

An apparatus for wrapping harvested crop material into bales wherein the wrapping material web is drawn off from a wrapping media supply which rotates about a vertical axis while, at the same time, the bale rotates about a horizontal axis. A sensor is provided which signals a tear in the wrapping media web or the absence of material media. The sensor may be optical ultrasonic or sense electromagnetic radiations of different frequency ranges, as appropriate for the media of which the wrapping media involved. A position sensor is provided which activates an evaluation of signals from the sensor that a signal is produced when the web tears or is absent.

10 Claims, 1 Drawing Sheet

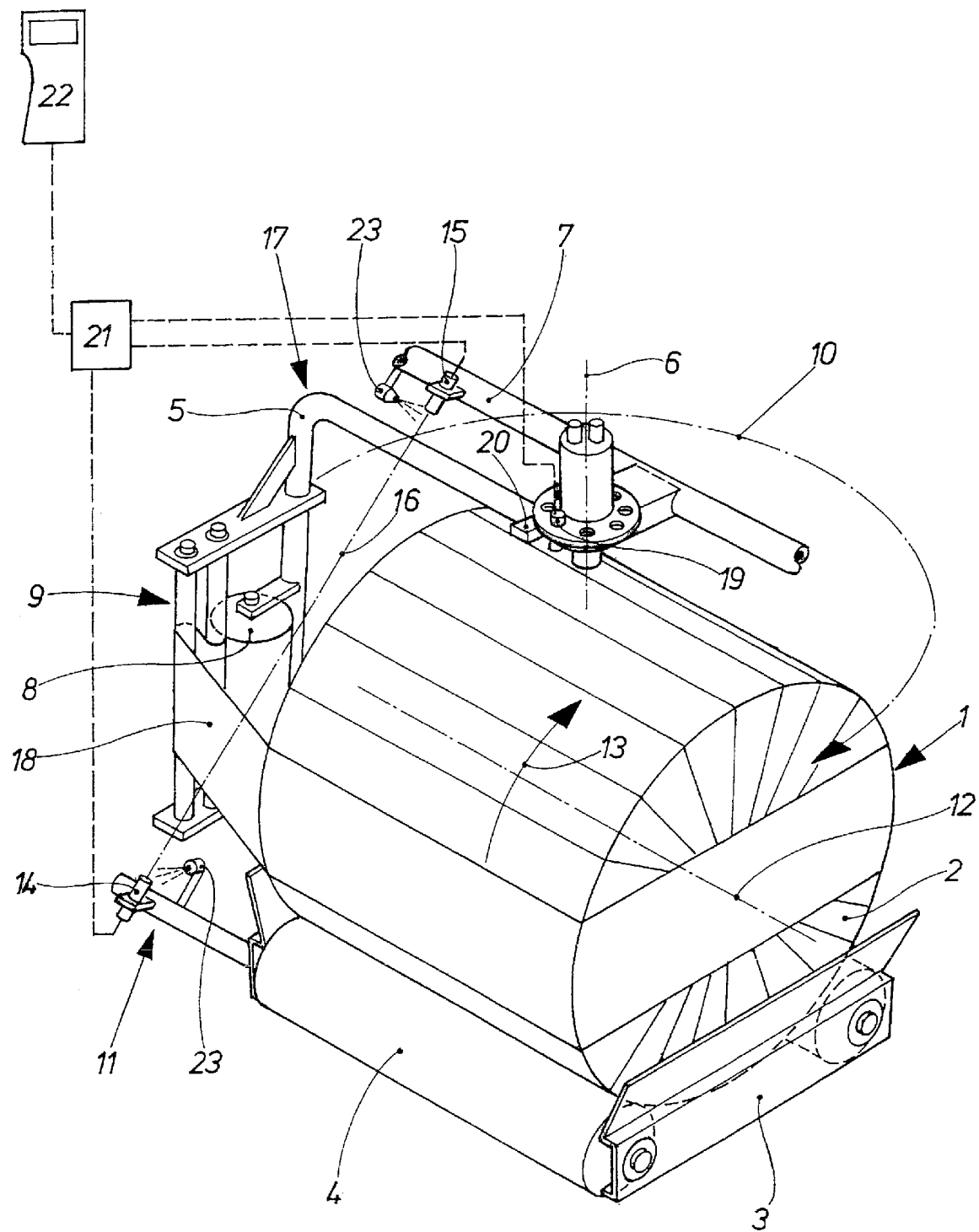

DEVICE FOR WRAPPING BODIES, IN PARTICULAR BALES OF HARVESTED MATERIAL

FIELD OF THE INVENTION

The invention relates to an apparatus for wrapping harvested crop materials into bales, wherein the apparatus includes sensors to detect imperfections in the wrapping material or its absence in the wrapping process.

BACKGROUND OF THE INVENTION

German Patent No. 200 15 540 U1 discloses a switch element which is arranged on a rotary arm. This switch element swivels radially outwards in the event the film tears off or reaches its end and interacts with a signal generator arranged stationarily in the circular path of revolution of the rotary arm. The advantage is that this device does not require any power to be transmitted by the upper rotary arm bearing arrangement, inasmuch as the signal generator is arranged to be relatively stationary. However, it has the disadvantage if, due to functional unreliability that may occur in the event of varying film tensions. Moreover, a relatively large number of special parts are required.

The following applications disclose further embodiments: DT 2435785 A1, EP 0924133 A1 and WO 98/41450. In addition, film tear indicators for round baler/wrapper combinations of the type Rollant 250RC UNIWRAP, made by Claas and for example Type 65040 Kombi Goweil are commercially available. But the latter require relatively complex power transmission systems between rotary arm and frame.

The object of the invention is to improve apparatus of the types and to provide a simple and, in particular, less expensive solution.

This object is achieved according to the invention in that at least one optical sensor, ultrasonic sensor or sensor for electromagnetic radiations of different frequency ranges is associated with the wrapping material web portion between the wrapping material supply and the bale while the sensor is disposed stationarily.

This solution according to the invention operates independently of the tension of the wrapping material, so that not only through-tears in the wrapping material web but also holes caused by overstretching of the film or partial tears may be detected, which other known means are incapable of doing. Moving parts are not needed due to the stationary mounting of the sensors, whereby their adjustment is easily accomplished. Only relatively inexpensive standard elements are used, which may advantageously be integrated into an electronic control system of the machines.

In an advantageous embodiment, the optical sensor is in the form of a one-way light barrier with a receiver on the one side of the wrapping material web portion and with a transmitter arranged in alignment with the receiver on the other side of the wrapping material web portion. Infrared transmitters have proved useful due to their insensitivity to dust.

A structurally simple embodiment is provided by the use of a reflex sensor, which operates with reflected light or reflected sound waves and thereby detects whether a wrapping material web portion is present. Alternatively, X-rays or light sources of other light wavelengths may be used.

In a particularly dusty environment, provision is made for one or more sensors to be associated with a cleaning device.

Further features and advantages of the invention are revealed by the following description of an exemplary environment, with reference to a single Figure providing a schematic illustration thereof.

BRIEF DESCRIPTION OF THE FIGURE

The figure presented herewith is a three-dimensional view of a bale wrapper in combination with the invention.

DETAILED DESCRIPTION OF THE PREFERRED EMBODIMENT OF THE INVENTION

Referring to the Figure, a bale wrapper of known construction for wrapping a bale, of harvested cropped material with a film 2 is shown. The bale wrapper comprises substantially a stationary wrapping table 3 with drivable conveyor elements 4 and a wrapping device with a rotary arm 5 mounted on a frame 7 so as to be rotatable about a vertical axis of rotation 6. At its lower end, it carries a film supply roll 8 as a wrapping material supply and a stretching unit 9.

During the wrapping process, supply roll 8 moves in a direction of rotation 10 about vertical axis 6 to wrap bale 1 of harvested crop material which is revolving about a horizontal axis of rotation 12 in a direction of rotation 13. Film 2 is thus drawn off supply roll 8 via stretching unit 9 and wrapped around bale 1 of harvested crop material. The drive of bale 1 and the drive of the rotary arm 5 are arranged with a particular transmission ratio to one another so that the film plies which are wound around the bale 1 overlap due to simultaneous rotation of the wrapping device and bale 1.

A novel feature is the arrangement of a light radiating system 11, comprising a transmitter 14 arranged stationarily on the wrapping table 3 and a receiver 15 arranged to be relatively stationary on frame 7. The two sensors, transmitter 14 and receiver 15 are aligned on a line 16, which runs, when the rotary arm 5 is in a particular position designated by the reference numeral 17, through the taut film portion 18 between supply roll 8 and bale 1. If the film tears or the supply roll 8 is used up, this is detected in that the light beam between transmitter 14 and receiver 15 is not interrupted. If the light beam between the transmitter 14 and receiver 15 of this light barrier arrangement is interrupted, the film portion 18 between bale 1 and supply roll 8 is in the taut state. An infrared (invisible) light beam is preferably emitted. However, the light beam may also be generated by a light-emitting diode, a laser or another illuminating means. Alternatively, sensors may also be used which operate for example with sound waves or X-rays.

The evaluation position 17 of the interrupted light beam arrangement of transmitter 14 and receiver 15 is fixed by a position sensor 19, which is arranged on frame 7 and interacts with switch faces 20 on rotary arm 5.

Transmitter 14, receiver 15 and position sensor 19 are in active connection with evaluation electronics 21 or a control unit for the machine control system or both together with a display-operating unit 22 for the operator. The light barrier arrangement comprising transmitter 14 and receiver 15 may be continually supplied with power during the entire operation. The evaluation zone may be preset by position sensor 19. When the rotary arm is in position 17 as shown, position sensor 19 activates for example evaluation of the light barrier signals, so that a signal is produced if the film tears or is used up. After rotation of the rotary arm 5 by approximately 180° in the direction of arrow 10, position sensor 19 again activates evaluation, but this time to check whether the transmitter 14 and receiver 15 are functioning correctly or are soiled. When the rotary arm is in the first position 17, an alarm signal may for example be produced by means of the display-operating unit 22 or a signal be transmitted to the machine control system to interrupt the wrapping process immediately. In the second rotary arm position, not shown, the signal may be transmitted to the display-operating unit 22 or be used to activate cleaning devices 23 for transmitter 14 and receiver 15, which may for example take the form of an air jet, a water jet or a mechanical cleaning element. As an alternative to evaluation of the second rotary arm position, transmitter 14 or receiver 15 or both may be operatively associated with soiling detectors, which transmit an alarm signal in the case of impending soiling or activate the cleaning devices 23.

The invention and the advantages thereof may also be achieved in essentially the same manner with "rotary table systems," in which the bale turns simultaneously about a vertical and a horizontal axis. In such event, it is appropriate to use only a single sensor, namely a reflex sensor operating in conformity with well known light wave or sound wave principles.

The invention claimed is:

1. An apparatus for wrapping a bale of agricultural material, at least one wrapping media web being drawn off from a wrapping material supply during the wrapping process and signal means being provided which signals a tear in the wrapping media web or that the wrapping media supply has been used up, characterized in that at least one of the following sensors: an optical sensor or an ultrasonic sensor or a sensor for electromagnetic radiations of different frequency ranges, or any combination thereof, is operatively associated with a portion of said wrapping media web between said wrapping media supply and said bale, said sensor or said combination of sensors being disposed relatively stationarily in the apparatus, said wrapping media supply being arranged on a rotary arm revolving around said bale during the wrapping process, and an evaluation for tears in the wrapping media web portion or the full consumption of the wrapping media supply being signaled by said signal means only when said wrapping media web portion moves through an active operating space of said sensor or a combination of said sensors.

2. An apparatus in accordance with claim 1, comprising a position sensor for said rotary arm or a timer which is in active connection with evaluation electronics of said sensor or a combination of said sensors.

3. An apparatus in accordance with claim 1, wherein said sensor or a combination of sensors are operatively associated with a cleaning device.

4. An apparatus in accordance of claim 3, comprising an automatic control for said cleaning device, said automatic control being a function of the degree that said sensor or said combination of sensors needs to be cleaned.

5. An apparatus in accordance with claim 1, wherein a said sensor or combination of sensors is operatively associated with evaluating electronics and a control unit for a control system of the apparatus together with a display unit.

6. An apparatus in accordance with claim 1, comprising a detector for detecting when said sensor or combination of sensors needs to be cleaned, said detector performing said detection function at least once during a part of a revolution of said rotary arm that rotates around the bale that is completely free of the operating space of the relevant said sensor or combination of sensors for sensing said web media.

7. An apparatus in accordance with claim 1, comprising a position sensor for said rotary arm that rotates said bale or a timer which is in active connection with evaluation electronics of said sensor or combination of sensors.

8. An apparatus for wrapping agricultural crop material which comprises: wrapping media supplying means from which at least one web of wrapping media is drawn for wrapping said material during the wrapping process thereof; sensing means consisting of an optical sensor, an ultrasonic sensor, a sensor of electromagnetic field radiations of a predetermined frequency range, or any combination thereof which is capable of sensing a tear or the absence of said wrapping media during the wrapping process; wrapping means for wrapping said wrapping media about said material, said wrapping media being movable relative to said sensing means during the wrapping process; and position sensing means for sensing when said wrapping media is in an evaluation zone for sensing a tear therein or is absent from said position, whereby information is provided when said sensing means should be activated, and said sensing means being provided with a cleaning device.

9. An apparatus in accordance with claim 8, wherein said cleaning device is provided selectively with manual or automatic activation means, said automatically operated activation means being activated based on the degree of need of for cleaning said sensing means.

10. An apparatus for wrapping agricultural crop material which comprises: wrapping media supply means from which at least one web of wrapping media is drawn for wrapping said material during the wrapping process thereof; sensing means consisting of an optical sensor, an ultrasonic sensor, a sensor of electromagnetic field radiations of a predetermined frequency range, or any combination thereof which is capable of sensing a tear or the absence of said wrapping media during the wrapping process; wrapping means for wrapping said wrapping media about said material, said wrapping media being movable relative to said sensing means during the wrapping process; position sensing means for sensing when said wrapping media is an evaluation zone for sensing a tear therein or is absent from said position, whereby information is provided when said sensing means should be activated; and detection means for detecting the need that said sensing means be cleaned, said detection means performing such function when said sensing means is in another position different from said position.

* * * * *